United States Patent
Rittmeyer et al.

(10) Patent No.: US 10,811,926 B2
(45) Date of Patent: Oct. 20, 2020

(54) GENERATOR STATORS AND METHODS OF MAKING GENERATOR STATORS

(71) Applicant: Hamilton Sundstrand Corporation, Charlotte, NC (US)

(72) Inventors: Gregory Alan Rittmeyer, Winnebago, IL (US); Kimberly R. Callan, Rockford, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 35 days.

(21) Appl. No.: 15/823,250

(22) Filed: Nov. 27, 2017

(65) Prior Publication Data

US 2019/0165636 A1    May 30, 2019

(51) Int. Cl.
| H02K 5/04 | (2006.01) |
| H02K 5/20 | (2006.01) |
| H02K 7/18 | (2006.01) |
| H02K 5/02 | (2006.01) |
| H02K 9/19 | (2006.01) |
| H02K 1/18 | (2006.01) |
| H02K 15/00 | (2006.01) |

(52) U.S. Cl.
CPC .............. *H02K 5/02* (2013.01); *H02K 1/185* (2013.01); *H02K 5/04* (2013.01); *H02K 5/20* (2013.01); *H02K 7/1807* (2013.01); *H02K 9/19* (2013.01); *H02K 15/0006* (2013.01); *H02K 2205/00* (2013.01); *H02K 2213/09* (2013.01)

(58) Field of Classification Search
CPC ............ H02K 1/185; H02K 5/04; H02K 5/20; H02K 5/24; H02K 7/1807; H02K 9/19; H02K 9/193; H02K 9/197; H02K 15/0006; H02K 2213/09

USPC .......................................................... 310/51
See application file for complete search history.

(56) References Cited

U.S. PATENT DOCUMENTS

| 2,632,861 A | * | 3/1953 | Morton | ................... H02K 1/185 |
| | | | | 310/431 |
| 3,009,072 A | * | 11/1961 | Mossay | ..................... H02K 9/19 |
| | | | | 310/57 |
| 4,764,699 A | * | 8/1988 | Nold | ....................... H02K 1/185 |
| | | | | 310/165 |

(Continued)

FOREIGN PATENT DOCUMENTS

| GB | 705178 A | 3/1954 |
| WO | 88/04857 A1 | 6/1988 |
| WO | 2012/050063 A1 | 4/2012 |

OTHER PUBLICATIONS

Extended European Search Report dated Apr. 8, 2019, issued during the prosecution of European Patent Application No. EP 18208460.8.

(Continued)

*Primary Examiner* — Quyen P Leung
*Assistant Examiner* — Eric Johnson
(74) *Attorney, Agent, or Firm* — Locke Lord LLP; Scott D. Wofsy; Joshua L. Jones

(57) ABSTRACT

A generator stator includes a housing arranged along a rotation axis, a sleeve seated in the housing and extending about the rotation axis, and a shim. The shim is arranged between the sleeve and the housing and fixes the sleeve radially relative to the housing to reduce diameter of a housing bore defined by the housing. Generators and methods of making generator stators are also described.

15 Claims, 6 Drawing Sheets

(56) References Cited

U.S. PATENT DOCUMENTS

| | | | |
|---|---|---|---|
| 6,517,328 B2* | 2/2003 | Makino | F04C 18/0215 |
| | | | 310/216.076 |
| 7,550,881 B1* | 6/2009 | Dietrich | H02K 1/187 |
| | | | 310/154.12 |
| 2002/0135244 A1* | 9/2002 | Strong | H02K 1/185 |
| | | | 310/51 |
| 2012/0013217 A1 | 1/2012 | Bradfield | |
| 2014/0111043 A1* | 4/2014 | Knappenberger | H02K 5/04 |
| | | | 310/65 |
| 2015/0076940 A1 | 3/2015 | Ohashi et al. | |

OTHER PUBLICATIONS

European Communication Pursuant to Art. 94(3) EPC, dated Feb. 4, 2020, issued during the prosecution of European Patent Application No. EP 18208460.8.

* cited by examiner

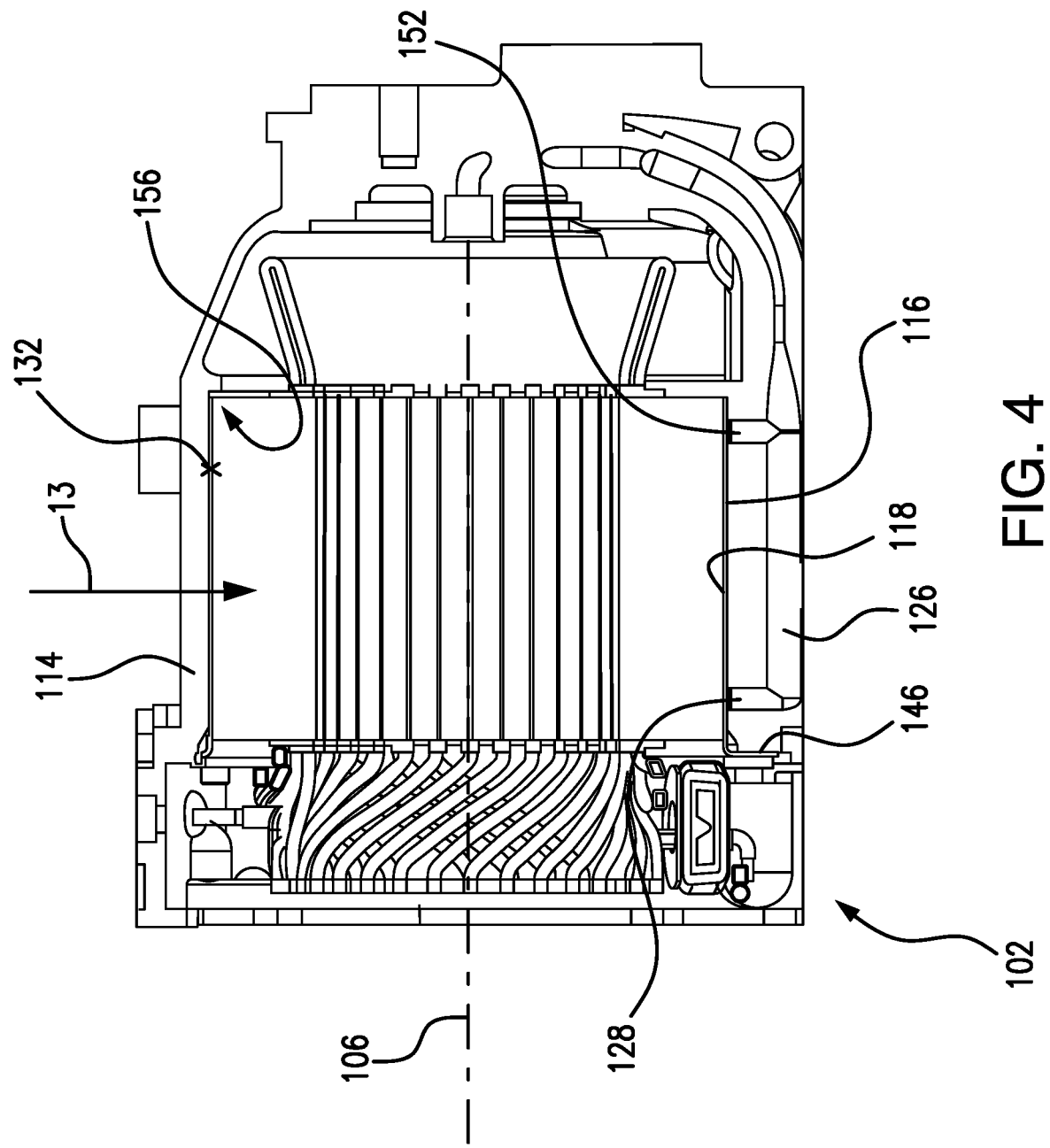

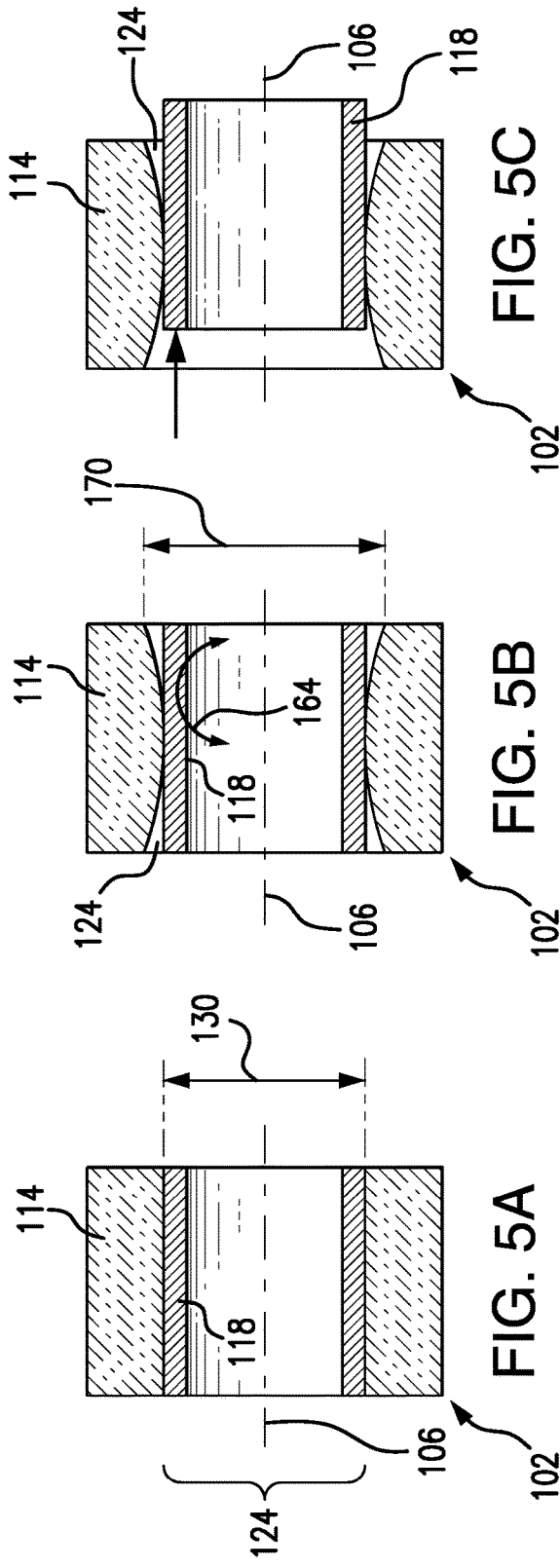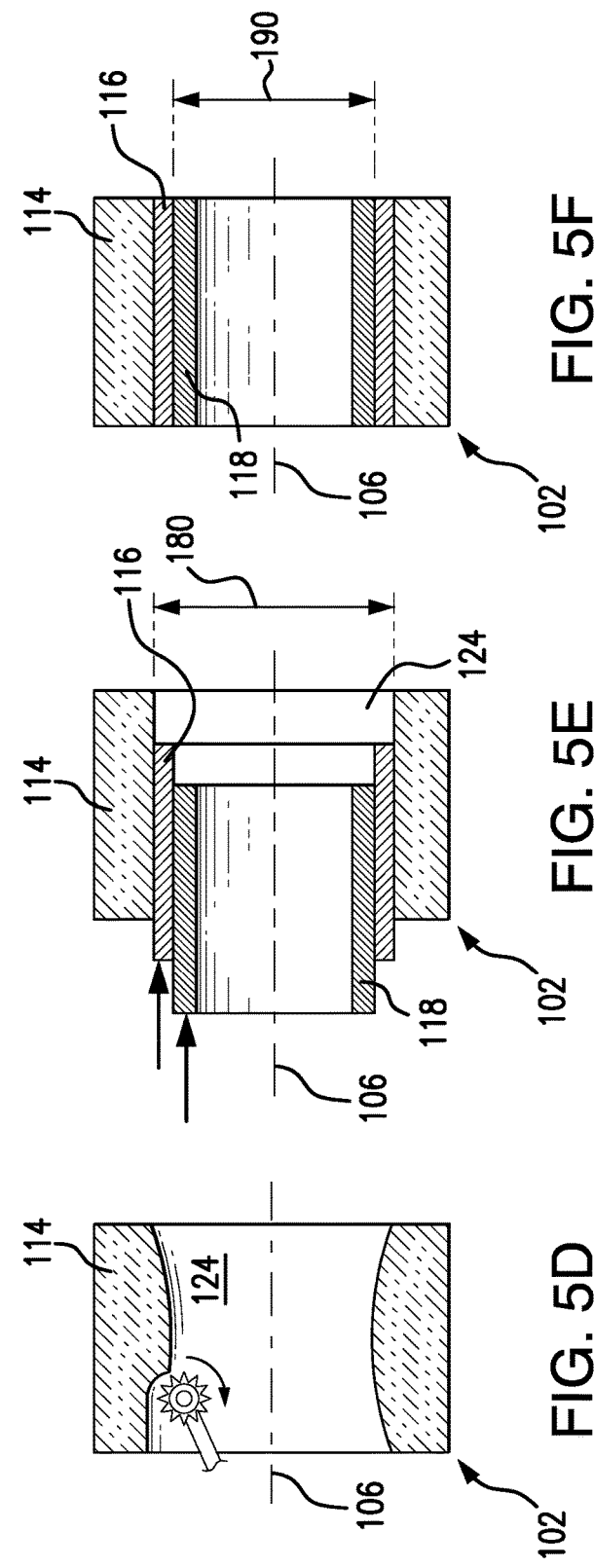

GENERATOR STATORS AND METHODS OF MAKING GENERATOR STATORS

BACKGROUND OF THE INVENTION

1. Field of the Invention

The present disclosure relates to electrical systems, and more particularly to stators for generators in aircraft electrical systems.

2. Description of Related Art

Electrical systems commonly employ generators to produce power for electrical devices connected to the electrical system. Generators typically employ a rotor supported for rotation relative to a stator, the rotor rotating such that a magnetic field generated by the rotor induces a current flow in coils seated within the stator. The stator typically defines a housing bore mounting a coil, the coil fixed to a coil mounting structure that is fixed within the stator housing, the rotor fixed within the stator housing and rotatable relative to the stator housing and coil.

In some generators the stator housing is formed from a material with a higher thermal conductivity than the structure mounting the stator coil. Since different materials expand at different rates, relative motion can occur between the stator and structure mounting the coil during cyclic heating and cooling during operation. The differential expansion can cause the fit between the housing and coil mounting structure to change, allowing movement between the stator housing and coil-mounting structure. The movement can cause wear about the housing bore periphery, progressively enlarging the housing bore, and requiring that the housing bore periodically be inspected for enlargement, and when sufficiently enlarged, the housing replaced.

Such conventional methods and systems have generally been considered satisfactory for their intended purpose. However, there is still a need in the art for improved generator stators, generators, and methods of making generator stators. The present disclosure provides a solution for this need.

SUMMARY OF THE INVENTION

A generator stator includes a housing with a housing bore arranged along a rotation axis and a sleeve seated in the housing bore. The sleeve extends about the rotation axis. A shim is arranged between the sleeve and the housing and fixes the sleeve radially relative to the housing to reduce diameter of the housing bore.

In certain embodiments, the shim can be compressively seated within the housing bore with an interference fit. The shim can have a slot. The slot can extend longitudinally along a length of the shim. Laterally opposed edges of the shim can be spaced apart from one another. Laterally opposed edges can abut one another. The shim can have first and second circumferences. The second circumference can be smaller than the first circumference. The shim can be formed from a material having a hardness that is greater than a hardness of a material forming the housing.

In accordance with certain embodiments, the housing can includes a material with a hardness that is less than the hardness of the material forming the sleeve. The housing can define a coolant circuit. The coolant circuit can have an outlet in fluid communication with the housing bore. The slot extending along the shim can be arranged on a side of the rotation axis opposite the coolant port. The housing can define a relief cut within the housing bore. The shim can be seated adjacent to the relief cut in the housing bore. No relief cut can be defined by the housing.

It is also contemplated that, in accordance with certain embodiments, the sleeve can have a flange. The flange can extend radially from the sleeve. The flange can radially overlap the shim. The flange can radially overlap the housing. An armature body with a current coil can be seated within the sleeve. A rotor with windings or permanent magnets can be supported for rotation within the armature body. The housing can have a housing bore diameter that is smaller than a diameter of the sleeve at a nominal temperature. The housing can have a housing bore diameter that is greater than a diameter of the sleeve at a nominal temperature.

A generator includes a stator as described above. The shim has a first circumference and a second circumference, the second circumference being smaller than the first circumference, and an armature body with a current coil is seated within the sleeve. A rotor carrying windings and/or permanent magnets is received within the armature body and supported for rotation relative to the stator. In certain embodiments the sleeve can have a flange extending radially from the sleeve. In accordance with certain embodiment the flange can radially overlap the housing. The shim can be compressively fixed within the housing in an interference fit.

A method of making a stator for a generator includes increasing the diameter of a housing bore defined by housing arranged along a rotation axis and seating a shim within the housing bore and about the rotation axis. A sleeve is seated within the shim and about the rotation axis such that the shim is arranged radially between the sleeve and the housing. The shim is then fixed in rotation relative to the housing.

In certain embodiments, the diameter of the housing bore can be increased by removing material from a surface of the housing bounding the housing bore with a sleeve. The diameter of the housing bore can be increased by removing additional material from the surface of housing bounding the housing bore in a machining operation. The diameter of the housing bore can be increased by heating the housing relative to a nominal temperature. An armature body having a current coil can be seated within the housing bore.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein:

FIG. 4 is a cross-sectional view of the generator stator of FIG. 1, showing the stator shim axially constrained between a housing and the stator sleeve;

FIGS. 5A-5F are cross-sectional side views of the generator stator of FIG. 1, schematically showing the stator housing bore wearing and being restored to the as-built bore diameter with the installation of a shim between the stator sleeve and stator housing.

DETAILED DESCRIPTION OF THE PREFERRED EMBODIMENTS

Figure 1:
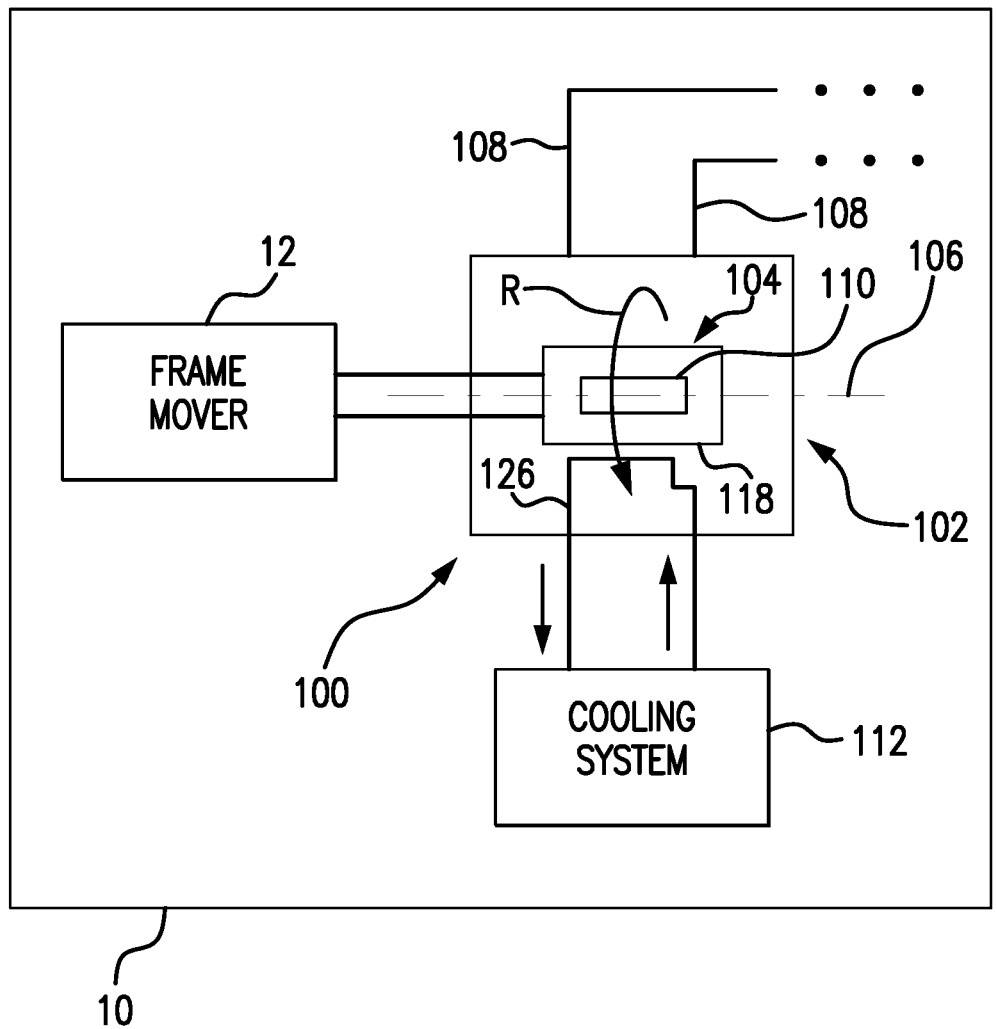
FIG. 1 is a schematic view of an exemplary embodiment of a generator constructed in accordance with the present disclosure, showing a generator rotor supported for rotation about a rotation axis relative to a generator stator.

Reference will now be made to the drawings wherein like reference numerals identify similar structural features or aspects of the subject disclosure. For purposes of explanation and illustration, and not limitation, a partial view of an exemplary embodiment of a generator in accordance with the present disclosure is shown in FIG. 1 and is designated generally by reference character 100. Other embodiments of generator, generator stators, and method of making generators and generator stators in accordance with the disclosure, or aspects thereof, are provided in FIGS. 2-6, as will be described. The systems and methods described herein can be used extending the service of life generator housings, such as when fretting wear from the stator sleeve removes material from the stator housing about the housing bore such that the housing bore diameter exceeds the housing bore-size specification, though the present disclosure is not limited to service life extension or to electrical generators in general.

Referring to FIG. 1, generator 100 is shown. Generator 100 includes a stator 102 with a sleeve 118 and a rotor 104. Stator 102 is arranged along a rotation axis 106 and is arranged to provide electrical power to electrical devices arranged on an aircraft 10 via leads 108. Rotor 104 carries windings or permanent magnets 110 and supported for rotation about rotation axis 106 relative to stator 102. A cooling system 112 is disposed in fluid communication with stator 102 through a coolant circuit 126 for providing a flow of coolant to stator 102. A prime mover 12 is operably connected to rotor 104 and is arranged to provide rotation R to rotor 104 for generating electrical power for electrical devices connected via leads 108. It is contemplated that prime mover 12 can include a gas turbine engine, such as a main engine or auxiliary power unit, or any other suitable source of mechanical rotation.

Figure 2:
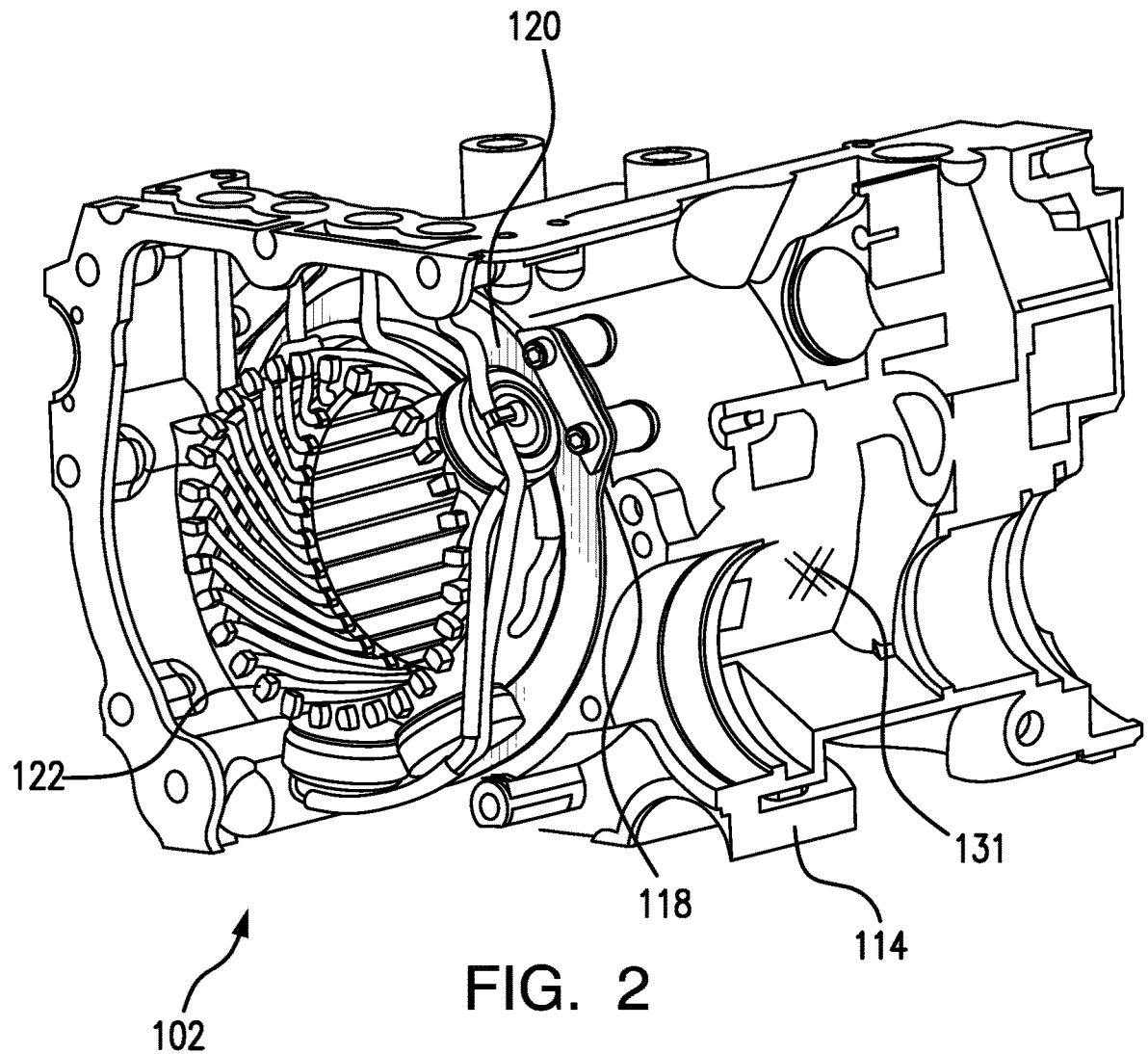
FIG. 2 is a perspective view of the generator stator of FIG. 1, showing the stator housing with an armature body inserted within a stator sleeve and stator shim.

With reference to FIG. 2, generator stator 102 is shown. Generator stator 102 includes a housing 114, a shim 116 (shown in FIG. 3), and a sleeve 118. Generator stator 102 also includes an armature body 120 with a current coil 122. Current coil 122 is supported by armature body 120. Armature body 120 is seated within sleeve 118. Sleeve 118 is seated within shim 116. Shim 116 is seated within a housing bore 124 (shown in FIG. 3) of housing 114, shim 116 thereby defining the location of armature body 120 and current coil 122 within housing bore 124 relative to rotation axis 106 (shown in FIG. 1).

Housing 114 defines housing bore 124 (shown in FIG. 3) and extends circumferentially about housing bore 124 and rotation axis 106. Within its interior housing 114 defines a coolant circuit 126 (shown in FIG. 1) through which coolant flows, coolant circuit 126 having at least one coolant outlet 128 (shown in FIG. 3) bounding housing bore 124 for providing coolant to housing bore 124 and at least one coolant return 152 (shown in FIG. 4) for returning coolant to coolant circuit 126. It is contemplated that housing 114 define a plurality of circumferential grooves 150 (shown in FIG. 3) within the surface of housing 114 and bounding housing bore 124 for circulating coolant and removing heat from current coil 122 through armature body 120, sleeve 118 and shim 116. It is contemplated that housing 114 includes a housing material 131 with high thermal conductivity with a low hardness relative to the material forming one or more of shim 116, sleeve 118, and/or armature body 120. Examples of suitable material include magnesium, aluminum and alloys of magnesium and/or aluminum.

Figure 3:
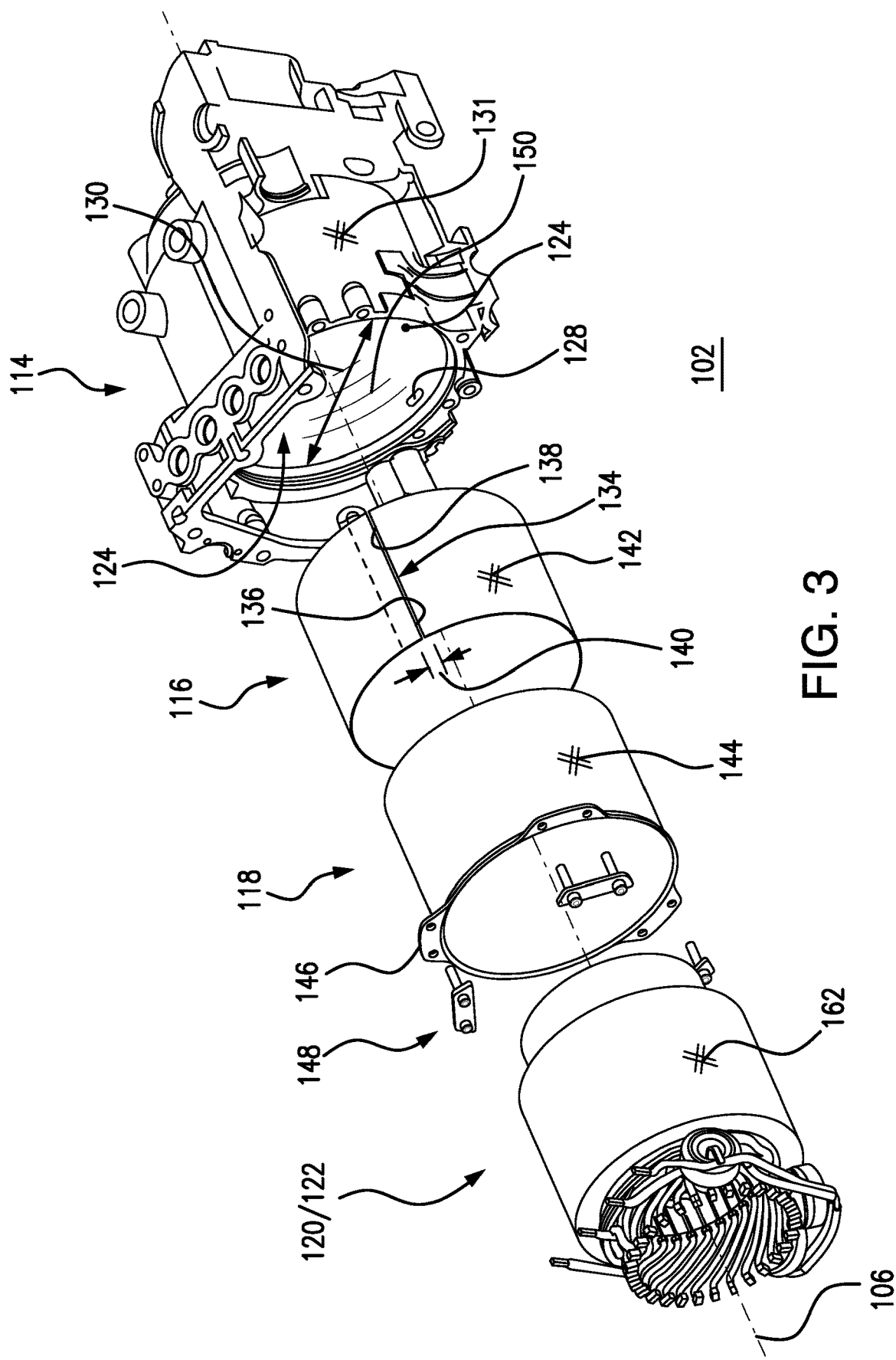
FIG. 3 is an exploded view of the generator stator of FIG. 1, showing a longitudinal slot defined along the length of the stator shim.

Referring to FIG. 3, generator stator 102 is shown in an exploded view. Generator stator 102 includes housing 114, which is arranged along rotation axis 106, sleeve 118 and shim 116. Sleeve 118 is seated in housing 114 and extends about rotation axis 106. Shim 116 is arranged between sleeve 118 and housing 114 and fixes sleeve 118 radially relative to housing to reduce a diameter 130 of housing bore 124, which is defined by housing 114. It is contemplated that shim 116 be located radially outward of sleeve 118, interposed between sleeve 118 and housing 114. In certain embodiments shim radially overlaps sleeve 118 along substantially the entirety of the longitudinal length of sleeve 118.

Shim 116 includes an annular body interrupted by a longitudinal slot 134. Longitudinal slot 134 is arranged on a side of rotation axis 106 radially opposite coolant outlet 128, coolant flow within annular coolant grooves 150 experiencing limited flow interruption by shim 116 and longitudinal slot 134. It is contemplated that shim 116 be formed from a shim material 142, shim material 142 having a hardness that is greater than the hardness of housing material 131. Examples of materials suitable for shim material 142 include steel materials, such as stainless and nickel steel alloys.

Longitudinal slot 134 extends longitudinally along the axial length of shim 116, shim 116 having first lateral edge 136 circumferentially facing a second lateral edge 138 that both bound longitudinal slot 134. It is contemplated that first lateral edge 136 can be spaced apart from second lateral edge 138 such that a gap width 140 is defined between first lateral edge 136 and second lateral edge 138. It is also contemplated that second lateral edge 138 can circumferentially abut first lateral edge 136. The distance between first lateral edge 136 and second lateral edge 138 can be a function of the temperature of generator 100 (shown in FIG. 1), gap width 140 increasing or decreasing in circumferential span according to temperature change of generator 100. In certain embodiments shim 116 is arranged such that gap width 140 separates second lateral edge 138 from first lateral edge 136, i.e., is greater than zero, at the lower boundary of the temperature operating range of generator 100.

Sleeve 118 has an annular body that extends continuously about rotation axis 106 and is formed from a sleeve material 144. Sleeve material 144 has a hardness that is greater than the hardness of housing material 131. It is contemplated that the hardness of sleeve material 144 can be substantially equivalent to shim material 142. In certain embodiments sleeve material 144 and shim material 142 are equivalent to one another, sleeve 118 and shim 116 expanding in contracting at substantially the same rate during operation of generator 100 over the generator temperature operating range. It is contemplated that sleeve 118 compressively seat shim 116 within housing bore 124 with an interference fit 132 (shown in FIG. 4) in at least a portion of the generator temperature operating range. In this respect interference fit 132 may exist within a temperature range including a nominal generator operating temperature and be absent within a temperature range including the minimum or maximum of the generator operating temperature.

Armature body 120 extends about rotation axis 106 and is seated within an interior of sleeve 118. Current coil 122 is seated within armature body 120 at a radially inward location. Armature body 120 includes a metallic material 162, which can magnetic steel plates axially stacked and laminated to one another.

Referring to FIGS. 3 and 4, sleeve 118 has a flange 146. Flange 146 extends radially from sleeve 118 and outward relative to rotation axis 106. It is contemplated that sleeve 118 radially overlap both a radial thickness of shim 116 and a portion of housing 114. The radial overlap for a fastener arrangement 148 to fix sleeve 118 in rotation about rotation axis 106. In the illustrated exemplary embodiment sleeve 118 has three (3) flanges each seating two (2) fasteners. This is for illustration purposes only and is non-limiting. As will be appreciated by those of skill in the art in view of the present disclosure sleeve 118 can have more than fewer or more flanges and/or fasteners, as suitable for an intended application.

With reference to FIGS. 5A-5F, stator housing 114 is shown undergoing wear and being returned to the as-built diameter via installation of shim 116. As shown in FIG. 5A, stator 102 is initially constructed stator housing 114 having bore diameter 130. Sleeve 118 is initially installed within housing bore 124 such that a radially outer surface of sleeve 118 in intimate mechanical contact with a radially inner surface of stator housing 114.

As shown in FIG. 5B, housing 114 wears during generator operation, e.g., via fretting 164, causing enlargement of housing bore 124. Fretting 164 causes housing bore 124 to widen, housing bore having a bore diameter 170 in FIG. 5B that is larger than bore diameter 130 (shown in FIG. 5A). It is contemplated that bore diameter 170 exceed a predetermined value, e.g., the bore-size specification, rendering housing 114 unsuitable for further service.

Once housing bore 124 becomes sufficiently oversized such that housing 114 is no longer suitable for service, stator 102 is overhauled, as shown in FIGS. 5C-5E. As shown in FIG. 5C, sleeve 118 is removed from housing bore 124. Material is then removed from housing 102, further enlarging housing 114 such that housing bore has a bore diameter 180 (shown in FIG. 5E). Bore diameter 180 is larger than bore diameter 170 (shown in FIG. 5B).

As shown in FIG. 5E, shim 116 is inserted in housing bore 124 such that a radially outer surface of shim 116 is in intimate mechanical contact with the inner surface of housing 114 bounding housing bore 124, the housing 114/shim 116 assembly defining an assembly diameter 190 that is substantially equivalent to the as-built bore diameter 130 (shown in FIG. 5A). Sleeve 118 is then inserted into the interior of shim 116 such that the radially outer surface of sleeve 118 is intimated mechanical contact with the radially inner surface of shim 116. As will be appreciated by those of skill in the art, the housing 114/shim 116 assembly provides support to sleeve 118 substantially equivalent to the support provided to sleeve 118 in the stator as-built condition, i.e., as shown in FIG. 5A, shim 116 thereby extending the service life of housing 102, which otherwise would require replacement.

Figure 6:
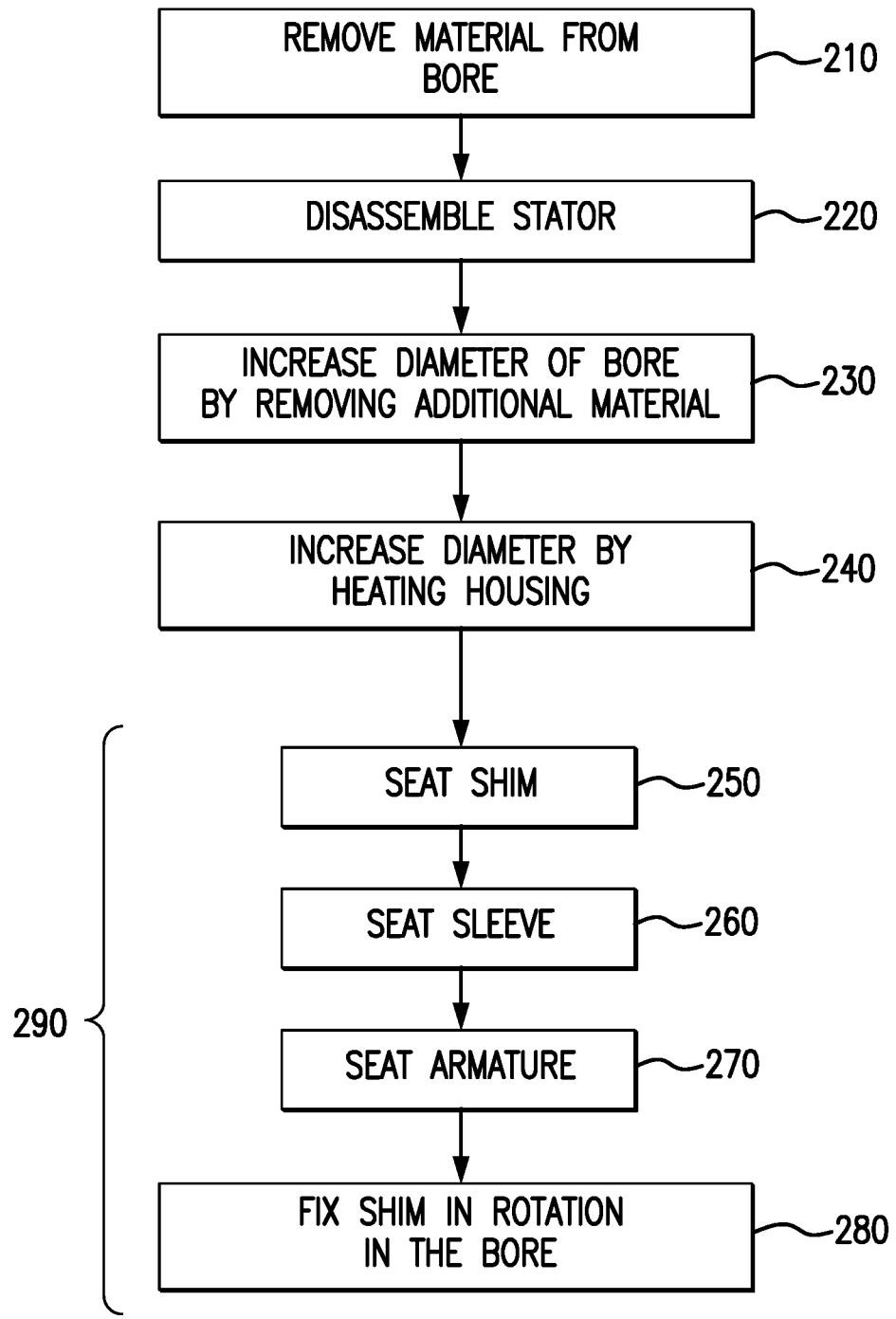
FIG. 6 is a diagram of a method of making a stator for a generator, showing the steps according to an exemplary embodiment.

With reference to FIG. 6, a method 200 of making a generator stator, e.g., generator stator 102 (shown in FIG. 1), is shown. As will be appreciated by those of skill in the art, when newly manufactured, generator stators typically have a housing bore that is properly sized, i.e., conforms to a housing bore-size diameter specification. In the case of exemplary generator stator 102 (shown in FIG. 2), housing bore diameter 130 is smaller than diameter of stator sleeve 118 (shown in FIG. 2).

As will also be appreciated by those of skill in the art in view of the present disclosure, the diameter of the housing bore can increase due to wear during generator operation. This is indicated by box 210 in FIG. 6, which shows removing material from a housing bore defined within a generator stator, e.g., housing bore 124 (shown in FIG. 2). The material removal occurs over time by fretting. More specifically, during generator service thermal cycling causes relative motion between the generator armature body and the generator stator housing. The relative motive in turn causes wear about the periphery of the housing bore defined by the stator housing. The rate of the fretting wear is influenced at least in part by the hardness of the material forming a stator sleeve, e.g., sleeve 118 (shown in FIG. 2), which seats against the interior surface of the housing with the housing bore in the generator as-built configuration.

Once material removal from operation 210 reaches an extent where the generator needs to be serviced the stator is disassembled, as shown with box 220. Disassembly includes removing an armature body, e.g., armature body 120, from the stator housing. Disassembly also includes removing the sleeve from the housing body. The housing bore is then oversized by increasing the diameter of the housing bore, e.g., diameter 130 (shown in FIG. 3), in a material removal operation, which removes additional material from the housing about the periphery of the housing bore, as shown in with box 230. This increases the diameter of the housing bore. In certain embodiments, the diameter of the housing bore is increased such that the diameter is greater than the diameter of the stator sleeve, as shown with diameter 180 in FIG. 5E. It is also contemplated that, in accordance with certain embodiments, a relief cut can additionally be defined within the housing bore, e.g., a relief cut 156 (shown in FIG. 4), to longitudinally restrain the shim within the housing bore upon assembly—the stator housing not having a relief cut in its original, as-built, configuration.

Once the housing bore has been oversized re-assembly of the generator stator begins. In certain embodiments the stator housing can be heated, thereby additionally increasing the diameter of the housing bore, as shown with box 240. Once heated a shim, e.g., shim 116, is seated within the housing bore, as shown with box 250. The sleeve is then inserted into the shim, as shown with box 260, and the armature body seated within the sleeve, as shown with box 270. The shim is thereafter fixed in rotation relative to the housing between the sleeve and the housing as shown with box 280. This can be done, for example, by cooling the stator assembly, thereby establishing an interference fit, e.g., interference fit 132 (shown inn FIG. 4), between the shim and the housing bore at nominal temperature, as shown with bracket 290.

Some generator stator housings can exhibit wear about the housing bore during service due to movement of the stator armature body and/or sleeve relative to the housing bore. The wear can be such that the housing bore exceeds the housing bore-size, i.e. diameter specification, for the housing, potentially requiring the stator housing to be replaced or repaired the return the over-sized housing bore to be within the as-built housing bore-size specification. While the housing bore oversize condition can sometimes be cured by adding material to the housing, such as with an additive manufacturing technique, such techniques can require specialized equipment add steps to the overhaul and repair process.

In embodiments described herein a shim is inserted into the housing bore to return the housing bore to the housing bore-size specification. In certain embodiments the housing bore diameter is increased by removing material from the housing bounding the housing bore. In accordance with certain embodiments the housing bore is machined to be about 0.010 inches larger in diameter uniformly along the longitudinal length housing bore relative to the as-built diameter, and a 0.005 inch thick shim inserted within the housing bore. Once fitted within the housing, the shim allows the stator housing to be returned to service, avoiding the need to replace the stator housing. In accordance with certain embodiments, disadvantages of weight increase from denser shim material and/or a need for increased coolant flow to compensate for the additional heat transfer interface between the current coil and coolant circuit are offset by the improved service life of the stator housing provided by the shim.

The methods and systems of the present disclosure, as described above and shown in the drawings, provide for generator stator housings with superior properties including increased service life. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A generator stator, comprising:
   a housing arranged along a rotation axis;
   a sleeve seated in the housing and extending about the rotation axis; and
   a shim arranged between the sleeve and the housing, wherein the shim fixes the sleeve radially relative to the housing to reduce diameter of a housing bore defined by the stator housing,
   wherein the housing defines a coolant circuit with an outlet and at least one return inlet in fluid communication with the housing bore, wherein the outlet and the return inlet are circumferentially aligned with one another, and wherein a slot extending longitudinally along the shim is arranged on a side of the rotation axis radially opposite the outlet and the return inlet.

2. The stator as recited in claim 1, wherein laterally opposed edges of the shim formed by the slot are spaced apart from one another.

3. The stator as recited in claim 1, wherein laterally opposed edges of the shim formed by the slot are spaced abutting one another.

4. The stator as recited in claim 1, wherein the housing defines a relief cut bounding the housing bore.

5. The stator as recited in claim 1, wherein the housing does not include a relief cut bounding the housing bore.

6. The stator as recited in claim 1, wherein the shim includes a material having a hardness that is greater than a hardness of a material forming the housing.

7. The stator as recited in claim 1, wherein the shim includes a material that is substantially equivalent to a material forming the sleeve.

8. The stator as recited in claim 1, wherein the sleeve has at least one flange extending radially from the sleeve.

9. The stator as recited in claim 8, wherein the at least one flange radially overlaps the shim.

10. The stator as recited in claim 8, wherein the at least one flange radially overlaps the housing.

11. The stator as recited in claim 1, further comprising an armature body with a current coil seated within the sleeve.

12. The stator as recited in claim 1, wherein the shim is compressively fixed within the housing in an interference fit.

13. The stator as recited in claim 1, wherein the housing has a housing bore diameter that is greater than a diameter of the sleeve at a nominal temperature.

14. A generator, comprising:
   a stator as recited in claim 1, wherein the shim has a first circumference and a second circumference, the second circumference being smaller than the first circumference, the stator further comprising an armature body with a current coil seated within the sleeve; and
   a rotor carrying at least one of windings and permanent magnets received within the armature body and supported for rotation relative to the stator.

15. The generator as recited in claim 1, wherein the sleeve has at least one flange extending radially from the sleeve, the at least one flange radially overlaps the housing, wherein the shim is compressively fixed within the housing in an interference fit.

* * * * *